United States Patent [19]

Kataumi

[11] Patent Number: 5,522,279
[45] Date of Patent: Jun. 4, 1996

[54] SHIFT LEVER STRUCTURE FOR OPERATING AUTOMATIC TRANSMISSION

[75] Inventor: Yoshimasa Kataumi, Shizuoka-ken, Japan

[73] Assignee: Fujikiko Kabushiki Kaisha, Chuou-ku, Japan

[21] Appl. No.: 343,122

[22] Filed: Nov. 22, 1994

[30] Foreign Application Priority Data

Nov. 30, 1993 [JP] Japan ................... 5-064034 U

[51] Int. Cl.$^6$ .................................................. B60K 20/04
[52] U.S. Cl. ................... 74/473 R; 74/491; 74/523
[58] Field of Search ..................... 74/473 R, 491, 74/523, 519, 520, 524, 525

[56] References Cited

U.S. PATENT DOCUMENTS

| | | | |
|---|---|---|---|
| 3,595,351 | 7/1971 | Ishida | 74/523 X |
| 4,245,521 | 1/1981 | Osborn | 74/473 R X |
| 5,372,051 | 12/1994 | Kanemats | 74/623 X |

FOREIGN PATENT DOCUMENTS

| | | |
|---|---|---|
| 2119708 | 12/1971 | France . |
| 2665272 | 7/1991 | France . |
| 430195 | 6/1927 | Germany ................... 74/473 |
| 2246068 | 9/1971 | Germany . |
| 4402599 | 1/1994 | Germany . |
| 4402597 | 1/1994 | Germany . |
| US9301049 | 2/1993 | WIPO . |

*Primary Examiner*—Rodney H. Bonck
*Assistant Examiner*—Saul Rodriguez
*Attorney, Agent, or Firm*—Hopkins & Thomas

[57] ABSTRACT

A shift lever structure (E) for operating an automatic transmission of a vehicle, includes a frame (10) fixed to a floor of the vehicle, a shaft (20,21,22) rotatably supported by the frame, a shift lever (30) and a select lever (40) connected with the automatic transmission. Both the shift lever and the select lever are molded integrally with the shaft by the insert-molding technique. In the arrangement, the lower end portion of the shift lever is engaged with the upper end portion of the select lever at an L-shaped bend (41). In operation, a force applied on the shift lever can be transmitted to the select lever directly, thereby reducing any twisting movement applied to the shaft. Therefore, it is possible to improve the strength of both levers and to decrease the strength required for the shaft.

6 Claims, 4 Drawing Sheets

5,522,279

SHIFT LEVER STRUCTURE FOR OPERATING AUTOMATIC TRANSMISSION

BACKGROUND OF THE INVENTION

The present invention relates to a shift lever structure for operating an automatic transmission installed in a vehicle.

In a prior art, there is known a conventional shift lever structure as shown in FIG. 1

Referring to FIG. 1, a tubular shaft 1 is provided at an axial center thereof with a shift lever 2 which is fixed thereto to extend upwardly. The shaft 1 further includes a select lever 3 which is also fixed thereto to extend downwardly so as to be associated with a not-shown automatic transmission. At both ends of the shaft 1, bushes 4 of synthetic resin are fitted thereinto to reduce the frictional coefficient. By inserting a mount bolt 7 into the respective bushes 4 through a frame 5 and then threadably engaging the mount bolt 7 with a nut 6, the shaft 1 can be rotatably supported by the frame 5.

In the above-mentioned structure, however, there is raised a problem that the shift lever 2 and the select lever 3 cannot be mounted on the shaft 1 with high accuracy, so that the dimensional quality of the assembly is not stable. Because, in the structure, both shifts 2 and 3 are secured to the shaft 1 by welding.

In addition, since the above shift lever structure employs the pair of bushes 4, the mount bolt 7 and the nut 6 as means for pivotably supporting the shaft 1, the costs of its production and maintenance are apt to be increased because of the number of parts constituting the structure.

SUMMARY OF THE INVENTION

It is therefore an object of the present invention to provide a shift lever structure for operating an automatic transmission, which can offer a reduction of the number of parts contained therein by allowing the above shaft to be formed by resinous material, whereby the costs of manufacturing and maintenance can be saved.

The objects of the invention described above can be accomplished by a shift lever structure for operating an automatic transmission of a vehicle, comprising a frame fixed to a floor of the vehicle;

a shaft rotatably supported by the frame, the shaft being made of synthetic resin;

a shift lever molded integral with the shaft by the insert-molding technique, the shift lever extending to a predetermined direction from the shaft; and a select lever molded integral with the shaft by the insert-molding technique and connected with the automatic transmission, the select lever extending to a direction opposite to the predetermined direction from the shaft;

wherein an end portion of the shift lever close to the shaft is engaged with an end portion of the select lever close to the shaft.

With the above mentioned arrangement, since the shift lever and the select lever can be molded integral with the shaft of synthetic resin by using the "insert" molding technique and since the end portion of the shift lever is engaged into the end portion of the select lever, it is possible to abolish the conventional welding process in manufacturing the shift lever structure of the invention. Therefore, the variance of the shift lever and the select lever in their mounting positions on the shaft can be decreased to thereby stabilize a quality of the completed shift lever structure. Furthermore, since the shaft is rotatably supported by the frame, the number of parts about the shift lever can be decreased and accordingly, it is possible to reduce the manufacturing and maintenance cost of the parts and the assembling cost thereof to a great extent.

In the present invention, preferably, the end portion of the select lever is formed to be a recess and the end portion of the shift lever is formed to have a circular cross section. The recess comprises a semi-circular part which is engaged with the shift lever and straight parts which are in contact with the semi-circular part tangentially. Preferably, the select lever has a burring part formed at an engagement portion thereof with the shaft by a burring processing technique.

In these cases, owing to the recess and the burring part of the select lever, it is possible to strengthen the conbination of the select lever with respect to the shift lever and shaft further.

Further, it is preferable that the frame includes opposite upright walls each of which has a bore and a cut-out which communicates the bore with the outside of the upright wall and that the axial end of the shaft includes a round portion of which diameter is substantially equal to the diameter of the bore and of which width is substantially equal to the width of the cut out.

With such an arrangement, the shaft can be rotatably supported by the frame through the intermediary of the upright walls. Futhermore, owing to the cut-outs provided in the walls, the shaft can be easily fitted into the respective bores of the upright walls.

Other objects and features of the present invention will become more fully apparent from the following description and appended claims taken in conjunction with the accompanying drawings.

DESCRIPTION OF THE PREFERRED EMBODIMENT

Figure 1:
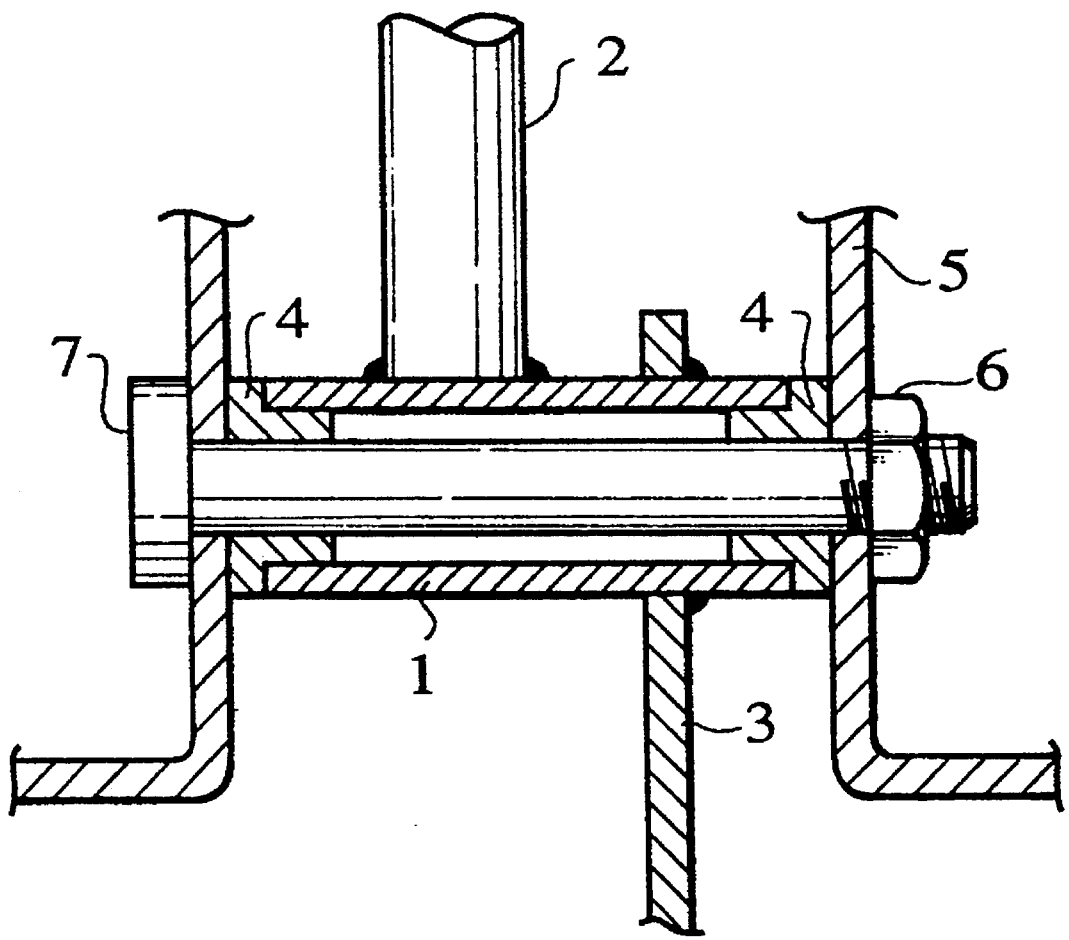
FIG. 1 is a cross sectional view showing a conventional shift lever structure.
Figure 2:
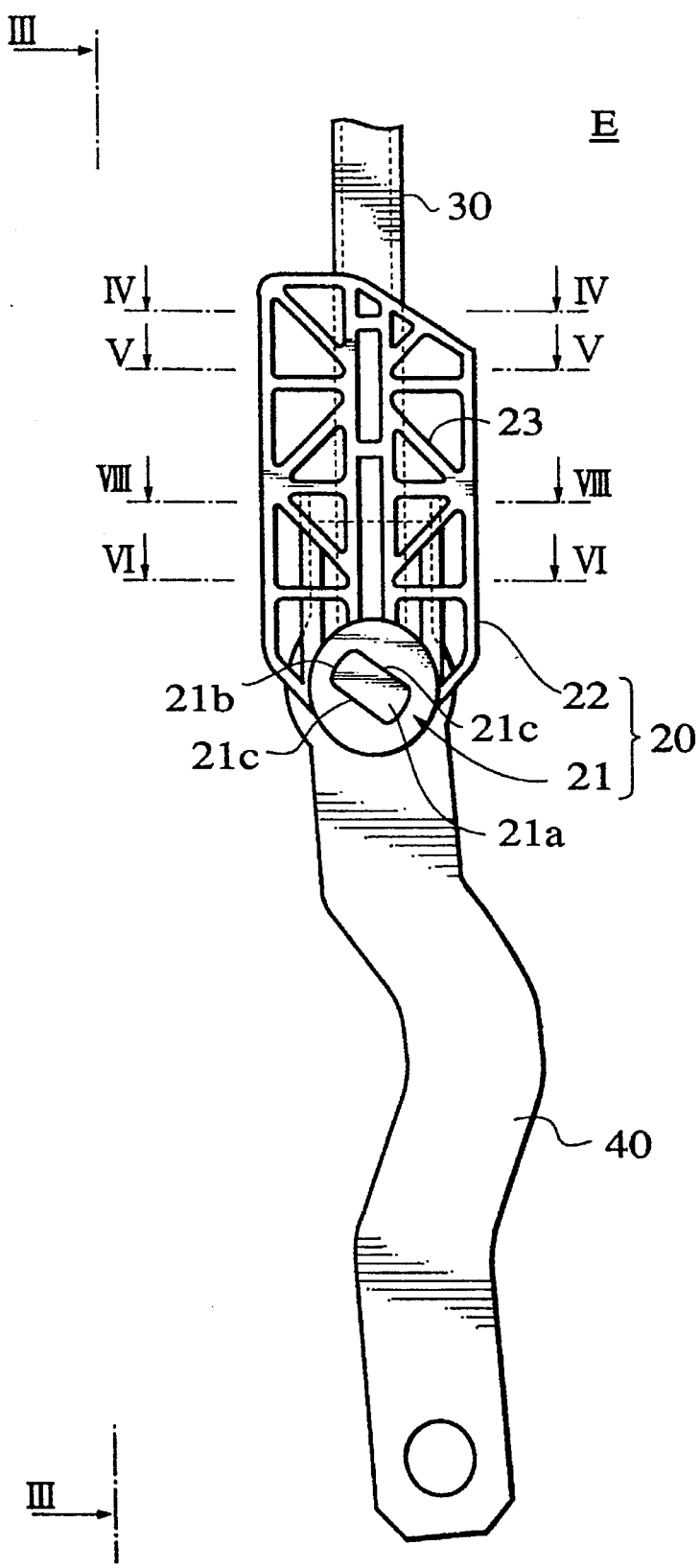
FIG. 2 is a front view showing a shift lever structure for operating an automatic transmission, in accordance with an embodiment of the present invention.
Figure 3:
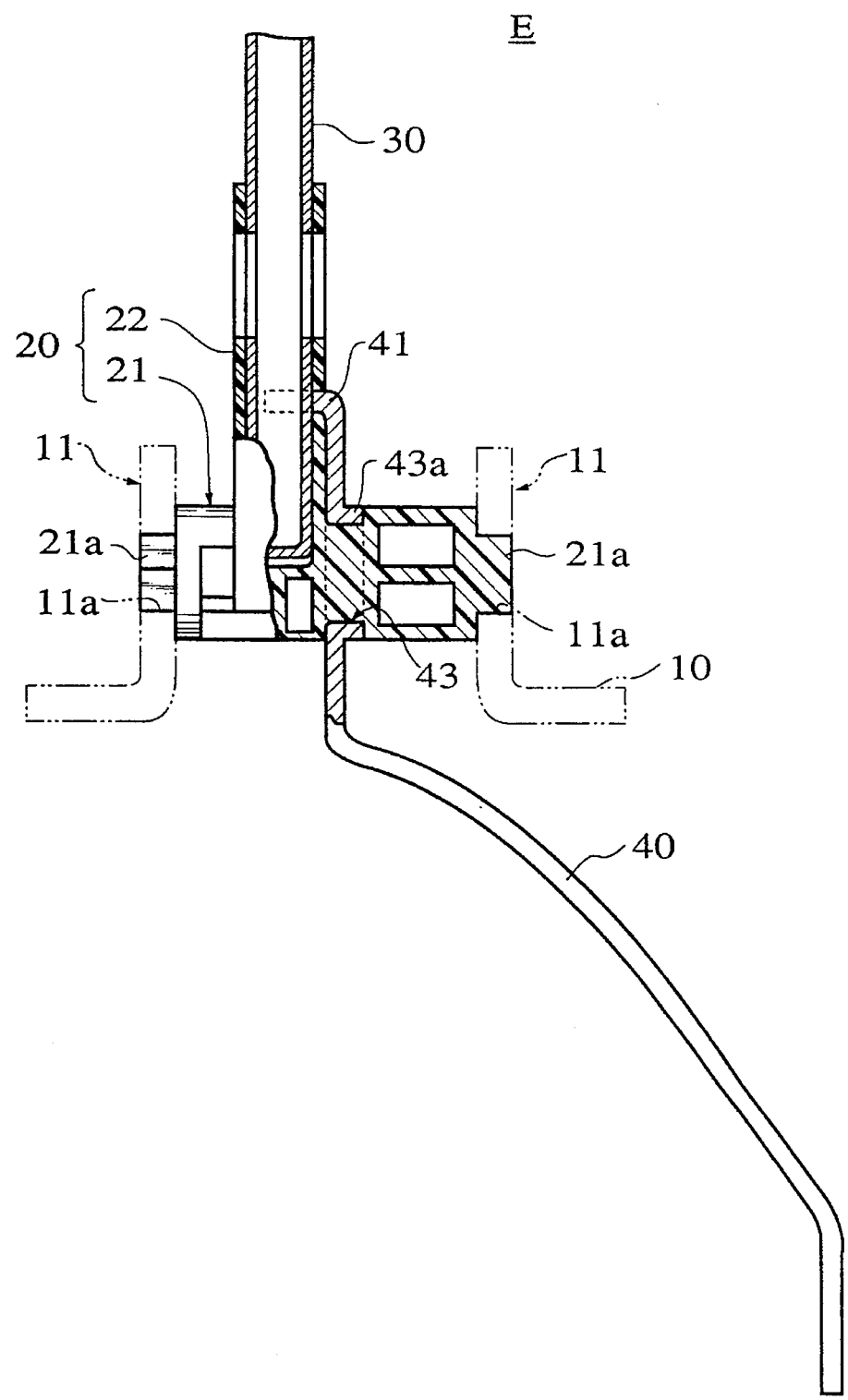
FIG. 3 is an explanatory view of the shift lever structure in the direction of arrows III in FIG. 2, including a cross sectional part thereof.
Figure 4:
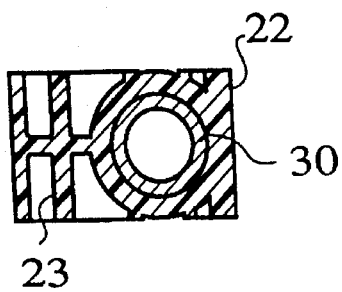
FIG. 4 is a cross sectional view taken along a line of IV—IV in FIG. 2.
Figure 5:
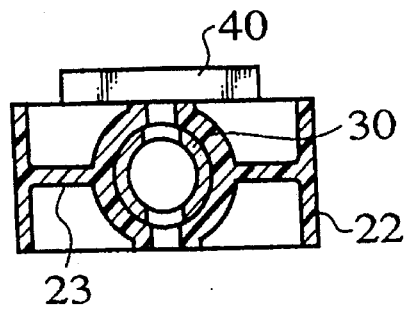
FIG. 5 is a cross sectional view taken along a line of V—V in FIG. 2.
Figure 6:
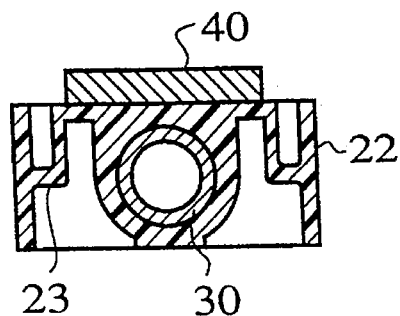
FIG. 6 is a cross sectional view taken along a line of VI—VI in FIG. 2.

An embodiment of the present invention are now described with reference to FIGS. 2 to 8.

In these figures, a letter E designates a shift lever structure for operating a not-shown automatic transmission of a vehicle, which includes a frame 10 and a shaft 20 made of synthetic resin and rotatably attached to the frame 10. The shaft 20 is provided at an axial center thereof with a shift lever 30 extending upward therefrom and a select lever 40 extending in the opposite direction to the extending direction of the shift lever 30. Both levers 30 and 40 are molded integrally with the shaft 20 by means of the "insertion" molding technique. Further, according to the invention, the select lever 40 is engaged at an upper part thereof with the shift lever 30.

In detail, the shift lever 30 is shaped to be tubular. Inside the shift lever 30, a not-shown rod having a positioning pin is arranged so as to be urged upwardly by a spring which is not also shown in the figure.

The shaft 20 made of synthetic resin consists of a pivot part 21 and a shift lever mounting part 22 which protrudes from the pivot part 21 upwardly at an axial center thereof and which is reinforced by ribs 23.

The pivot part 21 of a circular cross section is provided at both axial ends thereof with projections 21a. Each projection 21a is defined by a round portion 21b having a diameter less than the diameter of the pivot part 21 and two opposite surfaces 21c. The surfaces 21c are arranged in parallel with each other about a longitudinal axis (not shown) of the shaft 20. On the other hand, the shift lever mounting part 22 is arranged so as to surround the lower part of the shift lever 30.

Figure 7:
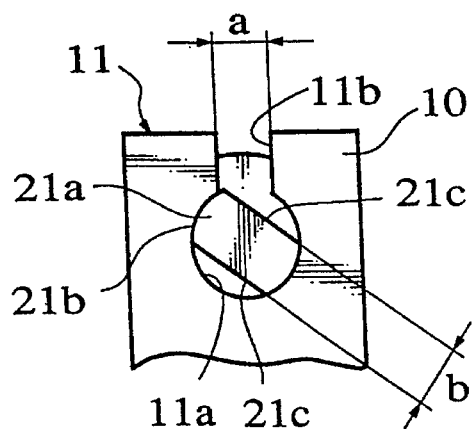
FIG. 7 is a front view of the shift lever structure in accordance with the present invention, showing a condition that a shaft of the structure is attached to a frame.
Figure 8:
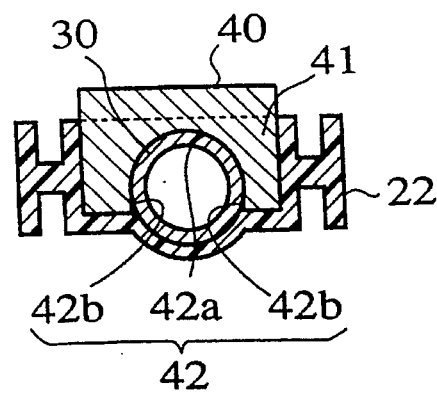
FIG. 8 is a cross sectional view taken along a line of VIII—VIII in FIG. 2, showing a condition under which the shift lever is engaged with a select lever.

The frame 10 is fixed to a vehicle floor in the vicinity of a driver's seat, being provided with upright walls 11 arranged at a predetermined interval. As shown in FIG. 7, each upright wall 11 is provided with a bore 11a of which diameter is substantially equal to that of the projection 21a and a cut-out 11b which communicates the bore 11a with the outside of wall 11 to open upward. The width (a) of the cut-out 11b is established to be substantially equal to the width (b) of the projection 21a, i.e., the distance between the surfaces 21c of. In assembling, by inserting the projections 21a of the shaft 20 into the cut-outs 11b, the round portions 21b of the shaft 20 can be rotatably fitted in the bores 11a.

The select lever 40, which is associated with the not-shown automatic transmission, has a L-shaped bend 41 formed at an upper part thereof with a U-shaped recess 42. The recess 42 consists of a semi-circular part 42a which is engaged with the shift lever 30 and straight parts 42b which are in contact with the part 42a tangentially. Further, the select lever 40 is provided with an attachment hole 43 into which the pivot part 21 of the shaft 20 is fitted. By the "burring" processing, a burring part 43a is formed about the attachment hole 43.

In the above-constructed shift lever structure E of the automatic transmission, since the shift lever 30 and the select lever 40 can be molded integrally with the shaft 20 of synthetic resin while the lower part of the shift lever 30 is engaged into the recess 42 of the select lever 40 by using the "insert" molding technique, it is possible to abolish the conventional welding process in manufacturing the shift lever structure of the invention. Therefore, the variance of the shift lever 30 and the select lever 40 in position can be decreased to thereby stabilize a quality of the completed shift lever structure.

In addition, according to the invention, since an operational force applied on the shift lever 30 can be transmitted to the select lever 40 directly without intermediary of the shaft 20 and thus any twisting force or the like is reduced on the shaft 20, it is possible to improve the strength of the levers 30 and 40 and to decrease the strength required for the shaft 20. Consequently, it is possible to scheme for a formation of the shaft 20 with synthetic resin and to lighten the the shift lever structure in comparison with the conventional structure.

Furthermore, by rotatably supporting the synthetic resinous shaft 10 by the frame 20, the number of parts about the pivot part 21 of the shift lever 30 can be decreased and accordingly, it is possible to reduce the manufacturing and maintenance cost of the parts and the assembling cost thereof to a great extent.

In addition, owing to the U-shaped recess 42 formed on the select lever 40, it is possible to prevent the select lever 40 from shaking with respect to the shift lever 30. Again, owing the burring part 43a arranged about the attachment hole 43 of the select lever 40, it is possible to reduce surface pressure produced between the pivot part 21 of the shaft 20 and a margin of the attachment hole 43, whereby the combination of the shaft 20 with the select lever 40 can be further strengthened.

Finally, it will be understood by those skilled in the art that the foregoing is a description of the preferred embodiment of the disclosed shift lever structure, and that various changes and modifications may be made to the present invention without departing from the spirit and scope thereof.

What is claimed is:

1. A shift lever structure for operating an automatic transmission of a vehicle, comprising:

a frame (10) for mounting to the floor of a vehicle;

a shaft (20) rotatably supported by said frame, said shaft being made of synthetic resin;

a shift lever (30) being made of material other than synthetic resin, connected with said shaft by the insert-molding technique, said shift lever extending in a predetermined direction from said shaft;

a select lever (40) for connection to an automatic transmission of the vehicle;

said select lever being made of material other than synthetic resin, and connected with said shaft by the insert-molding technique, said select lever extending to a direction opposite to said predetermined direction from said shaft;

said shift lever including an end portion positioned close to said shaft and being directly engaged with a portion (41) of said select lever close to said shaft.

2. A shift lever structure, as claimed in claim 1, wherein said end portion of said select lever is formed to be a recess.

3. A shift lever structure, as claimed in claim 2, wherein said end portion of said shift lever is formed to have a circular cross section and wherein said recess comprises a semi-circular part which is engaged with said shift lever and straight parts which are in contact with said semi-circular part tangentially.

4. A shift lever structure, as claimed in claim 3, wherein said select lever has a burring part formed at an engagement portion thereof with said shaft, said burring part being provided by a burring processing technique.

5. A shift lever structure, as claimed in claim 4, wherein said frame includes opposite upright walls for rotatably supporting said shaft therebetween, each of said upright wall having a bore into which an axial end of said shaft is engaged and a cut-out which communicates said bore with the outside of said upright wall.

6. A shift lever structure, as claimed in claim 5, wherein said axial end of said shaft comprises a round portion of which diameter is substantially equal to the diameter of said bore and of which width is substantially equal to the width of said cut out.

\* \* \* \* \*